United States Patent
Hart (10) Patent No.: US 7,849,728 B2
(45) Date of Patent: Dec. 14, 2010

(54) FUELING SYSTEM VAPOR RECOVERY AND CONTAINMENT PERFORMANCE MONITOR AND METHOD OF OPERATION THEREOF

(75) Inventor: Robert P. Hart, East Hampton, CT (US)

(73) Assignee: Veeder-Root Company, Greensboro, NC (US)

( * ) Notice: Subject to any disclaimer, the term of this patent is extended or adjusted under 35 U.S.C. 154(b) by 272 days.

(21) Appl. No.: 11/865,525

(22) Filed: Oct. 1, 2007

(65) Prior Publication Data
US 2008/0216916 A1    Sep. 11, 2008

Related U.S. Application Data

(60) Continuation of application No. 11/210,715, filed on Aug. 24, 2005, now Pat. No. 7,275,417, which is a continuation of application No. 10/935,024, filed on Sep. 7, 2004, now Pat. No. 6,964,283, which is a continuation of application No. 10/180,047, filed on Jun. 27, 2002, now Pat. No. 6,802,344, which is a division of application No. 09/725,727, filed on Nov. 30, 2000, now Pat. No. 6,622,757.

(60) Provisional application No. 60/168,029, filed on Nov. 30, 1999, provisional application No. 60/202,054, filed on May 5, 2000, provisional application No. 60/202,659, filed on May 8, 2000.

(51) Int. Cl.
*G01M 3/04* (2006.01)
(52) U.S. Cl. .......................................... 73/40
(58) Field of Classification Search ................... 73/1.35, 73/1.36, 40
See application file for complete search history.

(56) References Cited

U.S. PATENT DOCUMENTS 3,016,928 A    1/1962    Brandt (Continued)

FOREIGN PATENT DOCUMENTS

| GB | 2316060 A | 2/1998 |
|---|---|---|
| WO | WO 00/50850 A2 | 2/2000 |

*Primary Examiner*—Hezron Williams
*Assistant Examiner*—Rodney T Frank
(74) *Attorney, Agent, or Firm*—Nelson Mullins Riley & Scarborough, LLP (57) ABSTRACT

A method and apparatus for monitoring and determining fuel vapor recovery performance is disclosed. The dispensing of liquid fuel into a tank by a conventional gas pump nozzle naturally displaces a mixture of air and fuel ullage vapor in the tank. These displaced vapors may be recovered at the dispensing point nozzle by a vapor recovery system. A properly functioning vapor recovery system recovers approximately one unit volume of vapor for every unit volume of dispensed liquid fuel. The ratio of recovered vapor to dispensed fuel is termed the A/L ratio, which should ideally be approximately equal to one (1). The A/L ratio, and thus the proper functioning of the vapor recovery system, may be determined by measuring liquid fuel flow and return vapor flow (using a vapor flow sensor) on a nozzle-by-nozzle basis. The disclosed methods and apparatus provide for the determination of A/L ratios for individual nozzles using a reduced number of vapor flow sensors. The disclosed methods and apparatus also provide for the determination of fuel dispensing system vapor containment integrity, and the differentiation of true vapor recovery failures as opposed to false failures resulting from the refueling of vehicles provided with onboard vapor recovery systems.

17 Claims, 3 Drawing Sheets

U.S. PATENT DOCUMENTS

| | | |
|---|---|---|
| 3,641,817 A | 2/1972 | Dory |
| 3,735,634 A | 5/1973 | Clinton et al. |
| 3,748,903 A | 7/1973 | Irie et al. |
| 4,147,096 A | 4/1979 | Caswell |
| 4,166,485 A | 9/1979 | Wokas |
| 4,215,565 A | 8/1980 | Zanker |
| 4,312,238 A | 1/1982 | Rey |
| 4,508,127 A | 4/1985 | Thurston |
| 4,543,819 A | 10/1985 | Chin et al. |
| 4,566,504 A | 1/1986 | Furrow et al. |
| 4,570,686 A | 2/1986 | Devine |
| 4,611,729 A | 9/1986 | Gerstenmaier et al. |
| 4,653,334 A | 3/1987 | Capone |
| 4,687,033 A | 8/1987 | Furrow et al. |
| 4,739,648 A | 4/1988 | Horner |
| 4,749,009 A | 6/1988 | Faeth |
| 4,827,987 A | 5/1989 | Faeth |
| 4,835,522 A | 5/1989 | Andrejasich et al. |
| 4,842,027 A | 6/1989 | Faeth |
| 4,871,450 A | 10/1989 | Goodrich et al. |
| 4,938,251 A | 7/1990 | Furrow et al. |
| 4,967,809 A | 11/1990 | Faeth |
| 4,983,251 A | 1/1991 | Haisma et al. |
| 4,986,445 A | 1/1991 | Young et al. |
| 5,013,434 A | 5/1991 | Furrow |
| 5,027,499 A | 7/1991 | Prohaska |
| 5,032,008 A | 7/1991 | Yamamoto et al. |
| 5,038,838 A | 8/1991 | Bergamini et al. |
| 5,038,922 A | 8/1991 | Collins et al. |
| 5,040,077 A | 8/1991 | Hamano |
| 5,040,577 A | 8/1991 | Pope |
| 5,040,579 A | 8/1991 | Faeth et al. |
| 5,116,759 A | 5/1992 | Klainer et al. |
| 5,129,433 A | 7/1992 | Faeth |
| 5,143,258 A | 9/1992 | Mittermaier |
| 5,151,111 A | 9/1992 | Tees et al. |
| 5,156,199 A | 10/1992 | Hartsell, Jr. et al. |
| 5,165,379 A | 11/1992 | Thompson |
| 5,195,564 A | 3/1993 | Spalding |
| 5,203,384 A | 4/1993 | Hansen |
| 5,216,914 A | 6/1993 | Horner |
| 5,240,045 A | 8/1993 | Faeth |
| 5,244,022 A | 9/1993 | Gimby |
| 5,267,470 A | 12/1993 | Cook |
| 5,269,353 A | 12/1993 | Nanaji et al. |
| 5,280,814 A | 1/1994 | Stroh |
| 5,295,391 A | 3/1994 | Mastandrea et al. |
| 5,317,899 A | 6/1994 | Hutchinson et al. |
| 5,323,817 A | 6/1994 | Spalding |
| 5,332,008 A | 7/1994 | Todd et al. |
| 5,332,011 A | 7/1994 | Spalding |
| 5,333,654 A | 8/1994 | Faeth |
| 5,333,655 A | 8/1994 | Bergamini et al. |
| 5,355,915 A | 10/1994 | Payne |
| 5,365,985 A | 11/1994 | Todd et al. |
| 5,386,812 A | 2/1995 | Curran et al. |
| 5,417,256 A | 5/1995 | Hartsell et al. |
| 5,423,457 A | 6/1995 | Nicholas et al. |
| 5,450,883 A | 9/1995 | Payne et al. |
| 5,452,621 A | 9/1995 | Aylesworth et al. |
| 5,460,054 A | 10/1995 | Tran |
| 5,464,466 A | 11/1995 | Nanaji et al. |
| 5,500,369 A | 3/1996 | Kiplinger |
| 5,507,325 A | 4/1996 | Finlayson |
| RE35,238 E | 5/1996 | Pope |
| 5,542,458 A | 8/1996 | Payne et al. |
| 5,563,339 A | 10/1996 | Compton et al. |
| 5,563,341 A | 10/1996 | Fenner et al. |
| 5,568,828 A | 10/1996 | Harris |
| 5,571,310 A | 11/1996 | Nanaji |
| 5,590,697 A | 1/1997 | Benjey et al. |
| 5,592,979 A | 1/1997 | Payne et al. |
| 5,625,156 A | 4/1997 | Serrels et al. |
| 5,626,649 A | 5/1997 | Nanaji |
| 5,650,943 A | 7/1997 | Powell et al. |
| 5,663,492 A | 9/1997 | Alapati et al. |
| 5,671,785 A | 9/1997 | Andersson |
| 5,689,061 A | 11/1997 | Seitter et al. |
| 5,720,325 A | 2/1998 | Grantham |
| 5,728,275 A | 3/1998 | Twigg |
| 5,752,411 A | 5/1998 | Harpster |
| 5,755,854 A | 5/1998 | Nanaji |
| 5,757,664 A | 5/1998 | Rogers et al. |
| 5,767,175 A | 6/1998 | Kamekura et al. |
| 5,779,097 A | 7/1998 | Olson et al. |
| 5,780,245 A | 7/1998 | Maroteaux |
| 5,782,275 A | 7/1998 | Hartsell, Jr. et al. |
| 5,794,667 A | 8/1998 | Payne et al. |
| 5,796,009 A | 8/1998 | Delsing |
| 5,803,136 A | 9/1998 | Hartsell, Jr. |
| 5,832,967 A | 11/1998 | Andersson |
| 5,843,212 A | 12/1998 | Nanaji |
| 5,850,857 A | 12/1998 | Simpson |
| 5,857,500 A | 1/1999 | Payne et al. |
| 5,860,457 A | 1/1999 | Andersson |
| 5,868,175 A | 2/1999 | Duff et al. |
| 5,878,790 A | 3/1999 | Janssen |
| 5,889,202 A | 3/1999 | Alapati et al. |
| 5,898,108 A | 4/1999 | Mieczkowski et al. |
| 5,911,248 A | 6/1999 | Keller |
| 5,913,343 A | 6/1999 | Andersson |
| 5,942,980 A | 8/1999 | Hoben et al. |
| 5,944,067 A | 8/1999 | Andersson |
| 5,956,259 A | 9/1999 | Hartsell, Jr. et al. |
| 5,972,980 A | 10/1999 | Cornicelli et al. |
| 5,985,002 A | 11/1999 | Grantham |
| 5,988,232 A | 11/1999 | Koch et al. |
| 5,992,395 A | 11/1999 | Hartsell, Jr. et al. |
| 6,016,928 A | 1/2000 | Cothran et al. |
| 6,026,866 A | 2/2000 | Nanaji |
| 6,026,868 A | 2/2000 | Johnson, Jr. |
| 6,037,184 A | 3/2000 | Matilainen et al. |
| 6,038,922 A | 3/2000 | Mauze et al. |
| 6,047,745 A | 4/2000 | Fournier |
| 6,065,507 A | 5/2000 | Nanaji |
| 6,070,453 A | 6/2000 | Myers |
| 6,082,415 A | 7/2000 | Rowland et al. |
| 6,102,085 A | 8/2000 | Nanaji |
| 6,103,532 A | 8/2000 | Koch et al. |
| 6,123,118 A | 9/2000 | Nanaji |
| 6,131,621 A | 10/2000 | Garrard |
| 6,151,955 A | 11/2000 | Ostrowski et al. |
| 6,167,747 B1 | 1/2001 | Koch et al. |
| 6,167,923 B1 | 1/2001 | Hartsell, Jr. |
| 6,169,938 B1 | 1/2001 | Hartsell, Jr. |
| 6,170,539 B1 | 1/2001 | Pope et al. |
| 6,223,789 B1 | 5/2001 | Koch |
| 6,244,310 B1 | 6/2001 | Rowland et al. |
| 6,247,508 B1 | 6/2001 | Negley, III et al. |
| 6,302,165 B1 | 10/2001 | Nanaji et al. |
| 6,305,440 B1 | 10/2001 | McCall et al. |
| 6,325,112 B1 | 12/2001 | Nanaji |
| 6,336,479 B1 | 1/2002 | Nanaji |
| 6,338,369 B1 | 1/2002 | Shermer et al. |
| 6,347,649 B1 | 2/2002 | Pope et al. |
| 6,357,493 B1 | 3/2002 | Shermer et al. |
| D457,084 S | 5/2002 | Pope |
| 6,386,246 B2 | 5/2002 | Pope et al. |
| 6,418,981 B1 | 7/2002 | Nitecki et al. |
| 6,460,579 B2 | 10/2002 | Nanaji |
| 6,499,516 B2 | 12/2002 | Pope et al. |
| 6,549,857 B2 | 4/2003 | Fierro et al. |
| 6,622,757 B2 | 9/2003 | Hart et al. |
| 6,802,344 B2 | 10/2004 | Hart |

| | | | | | |
|---|---|---|---|---|---|
| 6,802,345 B1 | 10/2004 | Hart et al. | 6,941,978 B2 | 9/2005 | Riffle |
| 6,810,922 B1 | 11/2004 | Grantham | 6,968,868 B2 | 11/2005 | Hart et al. |
| 6,880,585 B2 | 4/2005 | Hart et al. | 6,975,964 B2 | 12/2005 | Reichler et al. |
| 6,901,786 B2 | 6/2005 | Hart | 2005/0080589 A1 | 4/2005 | Tiberi |
| 6,923,221 B2 | 8/2005 | Riffle | | | |

FUELING SYSTEM VAPOR RECOVERY AND CONTAINMENT PERFORMANCE MONITOR AND METHOD OF OPERATION THEREOF

CROSS REFERENCE TO RELATED APPLICATIONS

This application is a continuation of U.S. patent application Ser. No. 11/210,715, filed Aug. 24, 2005 now U.S. Pat. No. 7,275,417, which is a continuation of U.S. patent application Ser. No. 10/935,024, filed Sep. 7, 2004, now U.S. Pat. No. 6,964,283, which is a continuation of U.S. patent application Ser. No. 10/180,047, filed Jun. 27, 2002, now U.S. Pat. No. 6,802,344, which is a divisional of U.S. patent application Ser. No. 09/725,727, filed Nov. 30, 2000, now U.S. Pat. No. 6,622,757, which relates to and claims priority to U.S. Provisional Patent Application Ser. No. 60/168,029, filed on Nov. 30, 1999, entitled "Fueling System Vapor Recovery Performance Monitor," U.S. Provisional Patent Application Ser. No. 60/202,054, filed on May 5, 2000, entitled "Fueling System Vapor Recovery Performance Monitor," and U.S. Provisional Patent Application Ser. No. 60/202,659, filed on May 8, 2000, entitled "Method of Determining Failure of Fuel Vapor Recovery System." Each of the foregoing applications is incorporated herein by reference.

FIELD OF THE INVENTION

The present invention relates to a vapor recovery performance monitor for use in connection with gasoline dispensing facilities.

BACKGROUND OF THE INVENTION

Gasoline dispensing facilities (i.e. gasoline stations) often suffer from a loss of fuel to the atmosphere due to inadequate vapor collection during fuel dispensing activities, excess liquid fuel evaporation in the containment tank system, and inadequate reclamation of the vapors during tanker truck deliveries. Lost vapor is an air pollution problem which is monitored and regulated by both the federal government and state governments. Attempts to minimize losses to the atmosphere have been effected by various vapor recovery methods. Such methods include: "Stage-I vapor recovery" where vapors are returned from the underground fuel storage tank to the delivery truck; "Stage-II vapor recovery" where vapors are returned from the refueled vehicle tank to the underground storage tank; vapor processing where the fuel/air vapor mix from the underground storage tank is received and the vapor is liquefied and returned as liquid fuel to the underground storage tank; burning excess vapor off and venting the less polluting combustion products to the atmosphere; and other fuel/air mix separation methods.

A "balance" Stage-II Vapor Recovery System (VRS) may make use of a dispensing nozzle bellows seal to the vehicle tank filler pipe opening. This seal provides an enclosed space between the vehicle tank and the VRS. During fuel dispensing, the liquid fuel entering the vehicle tank creates a positive pressure which pushes out the ullage space vapors through the bellows sealed area into the nozzle vapor return port, through the dispensing nozzle and hoe paths, and on into the VRS.

It has been found that even with these measures, substantial amounts of hydrocarbon vapors are lost to the atmosphere, often due to poor equipment reliability and inadequate maintenance. This is especially true with Stage-II systems. One way to reduce this problem is to provide a vapor recovery system monitoring data acquisition and analysis system to provide notification when the system is not working as required. Such monitoring systems may be especially applicable to Stage-II systems.

When working properly, Stage-II vapor recovery results in equal exchanges of air or vapor (A) and liquid (L) between the main fuel storage tank and the consumer's gas tank. Ideally, Stage-II vapor recovery produces an A/L ratio very close to 1. In other words, returned vapor replaces an equal amount of liquid in the main fuel storage tank during refueling transactions. When the A/L ratio is close to 1, refueling vapors are collected, the ingress of fresh air into the storage tank is minimized and the accumulation of an excess of positive or negative pressure in the main fuel storage tank is prevented. This minimizes losses at the dispensing nozzle and evaporation and leakage of excess vapors from the containment storage tank. Measurement of the A/L ratio thus provides an indication of proper Stage-II vapor collection operation. A low ratio means that vapor is not moving properly through the dispensing nozzle, hose, or other part of the system back to the storage tank, possibly due to an obstruction or defective component.

Recently, the California Air Resources Board (CARB) has been producing new requirements for Enhanced Vapor Recovery (EVR) equipment. These include stringent vapor recovery system monitoring and In-Station Diagnostics (ISD) requirements to continuously determine whether or not the systems are working properly. CARB has proposed that, when the A/L ratio drops below a prescribed limit for a single or some sequence of fueling transactions, an alarm be issued and the underground storage tank pump be disabled to allow repair to prevent further significant vapor losses. The proposed regulations also specify an elaborate and expensive monitoring system with many sensors which will be difficult to wire to a common data acquisition system.

The CARB proposal requires that Air-to-Liquid (A/L) volume ratio sensors be installed at each dispensing hose or fuel dispensing point and pressure sensors be installed to measure the main fuel storage tank vapor space pressure. Note that the term 'Air' is used loosely here to refer to the air-vapor mix being returned from the refueled vehicle tank to the Underground storage tank. The sensors would be wired to a common data acquisition system used for data logging, storage, and limited pass/fail analysis. It is likely that such sensors would comprise Air Flow Sensors (AFS's).

A first embodiment of the present invention provides a more practical and less expensive solution than that proposed by CARB, which can substantially provide the monitoring capabilities needed. In this first embodiment of the present invention, the multiple AFS's called for by the CARB proposal may be replaced by fewer, or only one, AFS in conjunction with a more sophisticated AFS data analysis method.

With respect to use of vapor pressure sensors, CARB also proposes that these sensors be used to passively monitor the level of pressure in the main fuel storage tank vapor space, which is common to the fueling facility, to not only provide indication of proper operation of Stage-II vapor recovery methods, but also system containment integrity. This is done by monitoring the pressure patterns that occur within the storage tank during the various phases of storage tank and dispenser operation. The complexity of these patterns is a function of the type of Stage-II system in use.

CARB has proposed putting constraints on the pressure versus time relationships to identify when the vapor recovery system is causing undesirably high pressures for long enough time periods. when the vapor recovery system produces these elevated pressures, it may force significant amounts of vapor past the pressure relief valve at the end of the storage tank vent pipe or out of other leaky system valves and fittings and into the atmosphere as air pollution.

CARB proposes a passive test for identifying elevated storage tank pressures. The purpose of the passive test is to determine whether vapors are being properly retained in the storage tank vapor space. This is done by continuously monitoring and watching for evidence of a non-tight or improperly operated vapor recovery components by tracking small pressure levels over time and comparing them to prescribed operating requirements.

For instance, for a vapor recovery system that is intended to continuously maintain negative storage tank vapor space pressures, the CARB proposed requirements were (at one time) that an error condition would exist when pressure exceeds (i.e. is higher than) −0.1 inch water column (w.c.) for either more than one (1) consecutive hour, or more than 3 hours in any 24 hour period. An error condition would also exist when pressure exceeds (i.e. is higher than)+0.25 inches w.c. for either more than one (1) consecutive hour, or more than 3 hours in any 24 hour period. An error condition would also exist if pressure exceeded +1.0 inches w.c. for more than 1 hour in any 24 hour period. Determination of the foregoing error conditions requires frequent pressure measurements, data storage, and analysis. CARB has struggled with these requirements for a passive-type test and has changed them more than once.

In a second embodiment of the invention the CARB proposed passive pressure monitoring test may be augmented or replaced with an active pressure "tightness" or "leakage" test which provides a more definitive indication of system containment integrity. The active tightness test may only need to be run occasionally to find a break in the system. A once a day or once a month test is consistent with the intent of the variously proposed CARB test pass/fail criteria.

In yet another embodiment of the invention, the CARB proposed passive test for leakage may be replaced with an improved passive test for vapor leakage. Instead of measuring absolute pressure in the vapor containing elements of a facility, in the improved test changes in pressure over time are used to determine whether vapors are leaking from the system.

Both the aforementioned CARB methods for determining vapor recovery system performance and those of the invention may be detrimentally effected by the introduction of vehicles with Onboard Refueling Vapor Recovery (ORVR) devices that recover refueling vapors onboard the vehicle. Vapors produced as a result of dispensing fuel into an ORVR equipped vehicle are collected onboard, and accordingly, are not available to flow through a vapor return passage to an AFS for measurement. Thus, refueling an ORVR equipped vehicle results in a positive liquid fuel flow reading, but no return vapor flow reading (i.e. an A/L ratio equal to 0 or close thereto)—a condition that normally indicates vapor recovery malfunction. Because the vapor recovery system cannot distinguish between ORVR equipped vehicles and conventional vehicles, the vapor recovery system may be falsely determined to be malfunctioning when an ORVR equipped vehicle is refueled.

In the coming years, 2000 to 2020 and beyond, the proportion of ORVR vehicles in use will increase. Therefore this problem will be become more severe in the coming decades. If A/L sensing is to be used successfully for vapor recovery system monitoring, then a method is needed to distinguish between failed vapor recovery test events caused by an ORVR vapor-blocking vehicle and true failed vapor recovery test events (which can only occur for non-ORVR equipped vehicles).

OBJECTS OF THE INVENTION

It is therefore an object of the present invention to provide a method and system for determining acceptable performance of a vapor recovery system in a fueling facility.

It is another object of the present invention to provide a method and system for measuring the return flow of vapors from a dispensing point to a main fuel storage tank.

It is yet another object of the present invention to reduce the number of devices required to determine A/L ratios for individual dispensing points in a fueling facility.

It is still yet another object of the present invention to provide a method and system for determining the integrity of vapor containment in a main fuel storage tank.

It is still a further object of the present invention to provide a method and system for analyzing and indicating vapor recovery performance in a fueling facility.

It is still another object of the present invention to provide a system and method for determining true vapor recovery system failures.

It is yet another object of the present invention to provide a system and method for distinguishing between low A/L readings caused by a vapor recovery system failure and low A/L readings caused by the fueling of an ORVR-equipped vehicle.

Additional objects and advantages of the invention are set forth, in part, in the description which follows, and, in part, will be apparent to one of ordinary skill in the art from the description and/or from the practice of the invention.

SUMMARY OF THE INVENTION

In response to the foregoing challenges, applicants have developed an innovative system for monitoring vapor recovery in a liquid fuel dispensing facility having at least one fuel dispensing point connected to a main fuel storage system by a means for supplying liquid fuel to the dispensing point and a means for returning vapor from the dispensing point, said monitoring system comprising: a vapor flow sensor operatively connected to the means for returning vapor and adapted to indicate the amount of vapor flow through the means for returning vapor; a liquid fuel dispensing meter operatively connected to the means for supplying liquid fuel and adapted to indicate the amount of liquid fuel dispensed at the at least one fuel dispensing point; and a central electronic control and diagnostic arrangement having, a means for determining a ratio of vapor flow to dispensed liquid fuel for the at least one fuel dispensing point, said determining means receiving dispensed liquid fuel amount information from the liquid fuel dispensing meter and receiving vapor flow amount information from the vapor flow sensor, wherein the acceptability of vapor recovery for the fuel dispensing point is determined by said ratio of vapor flow to dispensed liquid fuel.

Applicants have also developed an innovative system for monitoring vapor recovery in a liquid fuel dispensing facility having at least two fuel dispensing points connected to a main fuel storage system by a vapor return pipeline, said monitoring system comprising: a vapor flow sensor operatively connected to the vapor return pipeline; means for determining dispensed liquid fuel amount information for each fuel dispensing point; and a means for determining a ratio of vapor flow to dispensed liquid fuel for the fuel dispensing points based on vapor flow sensor readings and dispensed liquid fuel amount information, wherein the acceptability of vapor recovery for the fuel dispensing points is determined by said ratio of vapor flow to dispensed liquid fuel.

Applicants have also developed an innovative method of monitoring vapor recovery in a liquid fuel dispensing facility having at least one fuel dispensing point connected to a main fuel storage system by a means for supplying liquid fuel to the dispensing point and a means for returning vapors from the dispensing point, said monitoring method comprising the steps of: determining at multiple times an amount of vapor flow through the means for returning vapors; determining at multiple times an amount of liquid fuel dispensed through the means for supplying liquid fuel; and determining a ratio of vapor flow to dispensed liquid fuel for the fuel dispensing point based on the amount of vapor flow through the means for returning vapors and the amount of liquid fuel dispensed through the means for supplying liquid fuel, wherein the acceptability of vapor recovery for the fuel dispensing point is determined by said ratio of vapor flow to dispensed liquid fuel.

Applicants have still further developed an innovative system for monitoring vapor containment in a liquid fuel dispensing facility having a main fuel storage system connected by a vent pipe-pressure relief valve arrangement to atmosphere, said monitoring system comprising: a pressure sensor operatively connected to the vent pipe; a vapor processor operatively connected to the vent pipe; and means for determining the acceptability of vapor containment in the main fuel storage system, said determining means being operatively connected to the pressure sensor to receive pressure level information therefrom and being operatively connected to the vapor processor to selectively cause the vapor processor to draw a negative pressure in the main fuel storage system.

Applicants have developed an innovative method of monitoring vapor containment in a liquid fuel dispensing facility having at least one main fuel storage tank connected by a vent pipe-pressure relief valve arrangement to atmosphere, said monitoring method comprising the steps of: identifying the start of an idle period for the liquid fuel dispensing facility; monitoring the liquid fuel dispensing facility to confirm maintenance of the idle period; determining whether pressure in the main fuel storage tank is equal or below a minimum level; selectively adjusting pressure in the main fuel storage tank to a preset lower level when the previously determined pressure is above the minimum level; monitoring variation of the pressure in the main fuel storage tank during the remainder of the idle period; determining the end of the idle period; and determining the acceptability of vapor containment in the main fuel storage tank based on the variation of the pressure during the idle period.

Applicants also developed an innovative method of determining vapor recovery system failures associated with a single fuel dispensing point, said method comprising the steps of: determining the vapor flow to dispensed fuel ratios for a plurality of fuel dispensing points; determining the number of vapor flow to dispensed fuel ratios that are below a preset minimum for each of the plurality of fuel dispensing points; determining the average number of vapor flow to dispensed fuel ratios below the preset minimum for the plurality of fuel dispensing points; and comparing the number vapor flow to dispensed fuel ratios below the preset minimum for each of the plurality of fuel dispensing points to the average number of vapor flow to dispensed fuel ratios below the present minimum to determine whether the vapor recovery system associated with each of the plurality of fuel dispensing points has failed.

It is to be understood that both the foregoing general description and the following detailed description are exemplary and explanatory only, and are not restrictive of the invention as claimed. The accompanying drawings, which are incorporated herein by reference and which constitute a part of this specification, illustrate certain embodiments of the invention, and together with the detailed description serve to explain the principles of the present invention.

BRIEF DESCRIPTION OF THE DRAWINGS

The invention will be described in conjunction with the following drawings in which like reference numerals designate like elements and wherein.

DETAILED DESCRIPTION OF THE INVENTION

A first embodiment of the invention is described in connection with FIG. 1, which shows a vapor recovery and containment monitoring system for use in a liquid fuel dispensing facility 10. The dispensing facility 10 may include a station house 100, one or more fuel dispenser units 200, a main fuel storage system 300, means for connecting the dispenser units to the main fuel storage system 400, and one or more vapor (or air) flow sensors (AFS's) 500.

The station house 100 may include a central electronic control and diagnostic arrangement 110 that includes a dispenser controller 120, dispenser current loop interface wiring 130 connecting the dispenser controller 120 with the dispenser unit(s) 200, and a combined data acquisition system/in-station diagnostic monitor 140. The dispenser controller 120 may be electrically connected to the monitor 140 by a first wiring bus 122. The interface wiring 130 may be electrically connected to the monitor 140 by a second wiring bus 132. The monitor 140 may include standard computer storage and central processing capabilities, keyboard input device(s), and audio and visual output interfaces among other conventional features.

The fuel dispenser units 200 may be provided in the form of conventional "gas pumps." Each fuel dispenser unit 200 may include one or more fuel dispensing points typically defined by the nozzles 210. The fuel dispenser units 200 may include one coaxial vapor/liquid splitter 260, one vapor return passage 220, and one fuel supply passage 230 per nozzle 210. The vapor return passages 220 may be joined together before connecting with a common vapor return pipe 410. The units 200 may also include one liquid fuel dispensing meter 240 per nozzle 210. The liquid fuel dispensing meters 240 may provide dispensed liquid fuel amount information to the dispenser controller 120 via the liquid fuel dispensing meter interface 270 and interface wiring 130.

The main fuel storage system 300 may include one or more main fuel storage tanks 310. It is appreciated that the storage tanks 310 may typically be provided underground, however, underground placement of the tank is not required for application of the invention. It is also appreciated that the storage tank 310 shown in FIGS. 1 and 2 may represent a grouping of multiple storage tanks tied together into a storage tank network. Each storage tank 310, or a grouping of storage tanks, may be connected to the atmosphere by a vent pipe 320. The vent pipe 320 may terminate in a pressure relief valve 330. A vapor processor 340 may be connected to the vent pipe 320 intermediate of the storage tank 310 and the pressure relief valve 330. A pressure sensor 350 may also be operatively connected to the vent pipe 320. Alternately, it may be connected directly to the storage tank 310 or the vapor return pipe 410 below or near to the dispenser 200 since the pressure is normally substantially the same at all these points in the vapor containment system. The storage tank 310 may also include an Automatic Tank Gauging System (ATGS) 360 used to provide information regarding the fuel level in the storage tank. The vapor processor 340, the pressure sensor 350, and the automatic tank gauging system 360 may be electrically connected to the monitor 140 by third, fourth, and fifth wiring busses 342, 352, and 362, respectively. The storage tank 310 may also include a fill pipe and fill tube 370 to provide a means to fill the tank with fuel and a submersible pump 380 to supply the dispensers 200 with fuel from the storage tank 310.

The means for connecting the dispenser units and the main fuel storage system 400 may include one or more vapor return pipelines 410 and one or more fuel supply pipelines 420. The vapor return pipelines 410 and the fuel supply pipelines 420 are connected to the vapor return passages 220 and fuel supply passages 230, respectively, associated with multiple fuel dispensing points 210. As such, a "vapor return pipeline" designates any return pipeline that carries the return vapor of two or more vapor return passages 220.

The AFS 500 is operatively connected to a vapor return pipeline 410. A basic premise of the system 10 is that it includes at most one AFS 500 (also referred to more broadly as vapor flow sensors) for each fuel dispenser unit 200. Thus, the AFS 500 must be operatively connected to the vapor return system downstream of the vapor return passages 220. If such were not the case, the system would include one AFS 500 per nozzle 210 which violates the basic premise of the invention. Each AFS 500 may be electrically connected to the monitor 140 by a sixth wiring bus 502.

In order to determine the acceptability of the performance of vapor recovery in the facility 10, the ratio of vapor flow to dispensed liquid fuel is determined for each fuel dispensing point 210 included in the facility. This ratio may be used to determine if the fuel dispensing point 210 in question is in fact recovering an equal volume of vapor for each unit volume of liquid fuel dispensed by the dispensing point 210.

Figure 1:
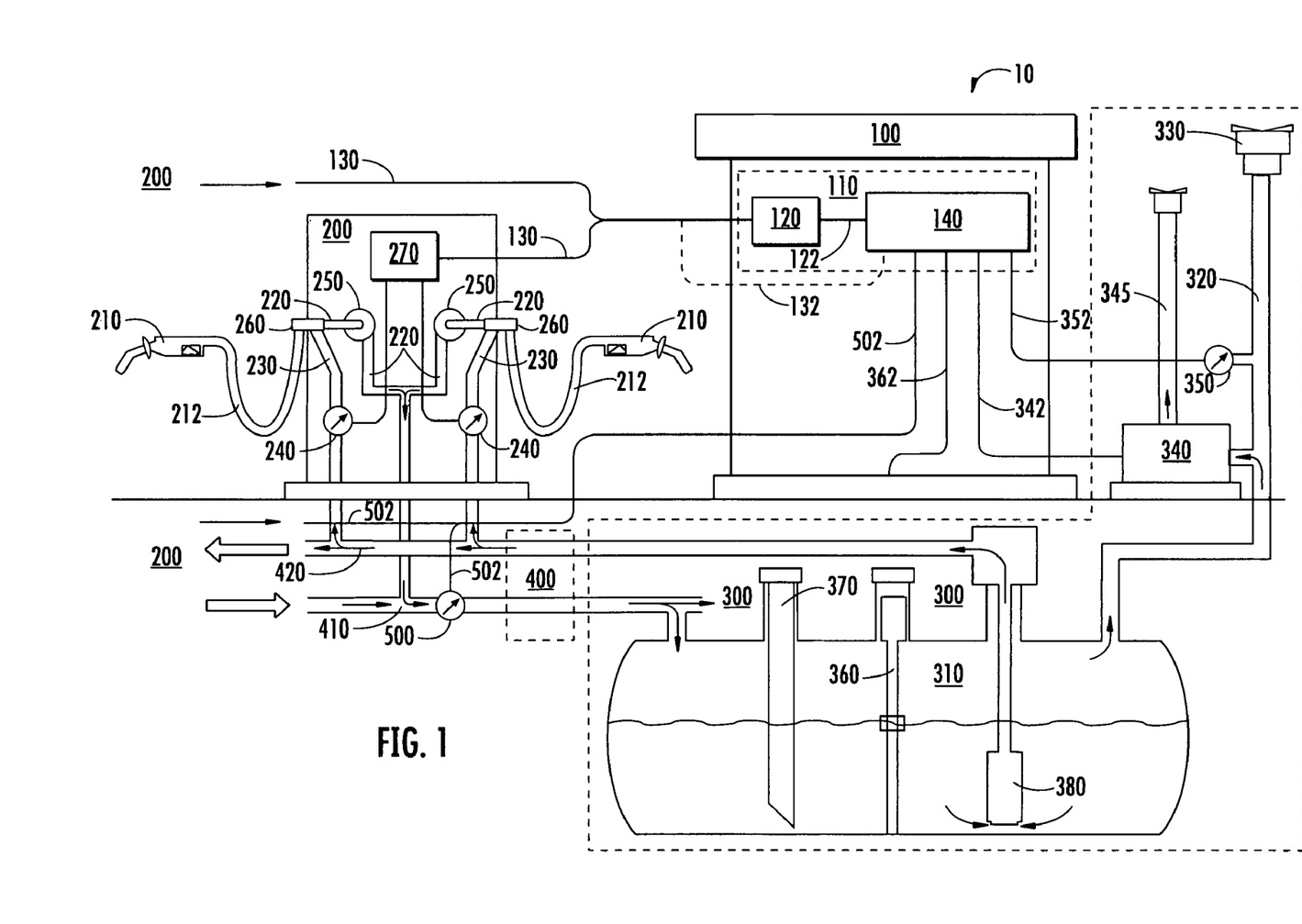
FIG. 1 is a schematic view of a fueling system vapor recovery performance monitor in accordance with an embodiment of the present invention.

In the embodiment of the invention shown in FIG. 1, each dispensing point 210 is served by an AFS 500 that is shared with at least one other dispensing point 210. Mathematical data processing (described below) is used to determine an approximation of the vapor flow associated with each dispensing point 210. The amount of fuel dispensed by each dispensing point 210 is known from the liquid fuel dispensing meter 240 associated with each dispensing unit. Amount of fuel (i.e. fuel volume) information may be transmitted from each dispensing meter 240 to the dispenser controller 120 for use by the monitor 140. In an alternative embodiment of the invention, the dispensing meters 240 may be directly connected to the monitor 140 to provide the amount of fuel information used to determine the A/L ratio for each dispensing point 210.

Each AFS 500 measures multiple (at least two or more) dispensing point return vapor flows. In the embodiment of the invention shown in FIG. 1, a single AFS 500 measures all the dispensing point vapor flows for the facility 10. In the case of a single AFS per facility 10, the AFS is installed in the single common vapor return pipeline which runs between all the dispensers as a group, which are all tied together into a common dispenser manifold pipe, and all the main fuel storage tanks as a group, which are all tied together in a common tank manifold pipe. Various groupings of combinations of feed dispensing point air flow's per AFS are possible which fall between these two extremes described.

Figure 2:
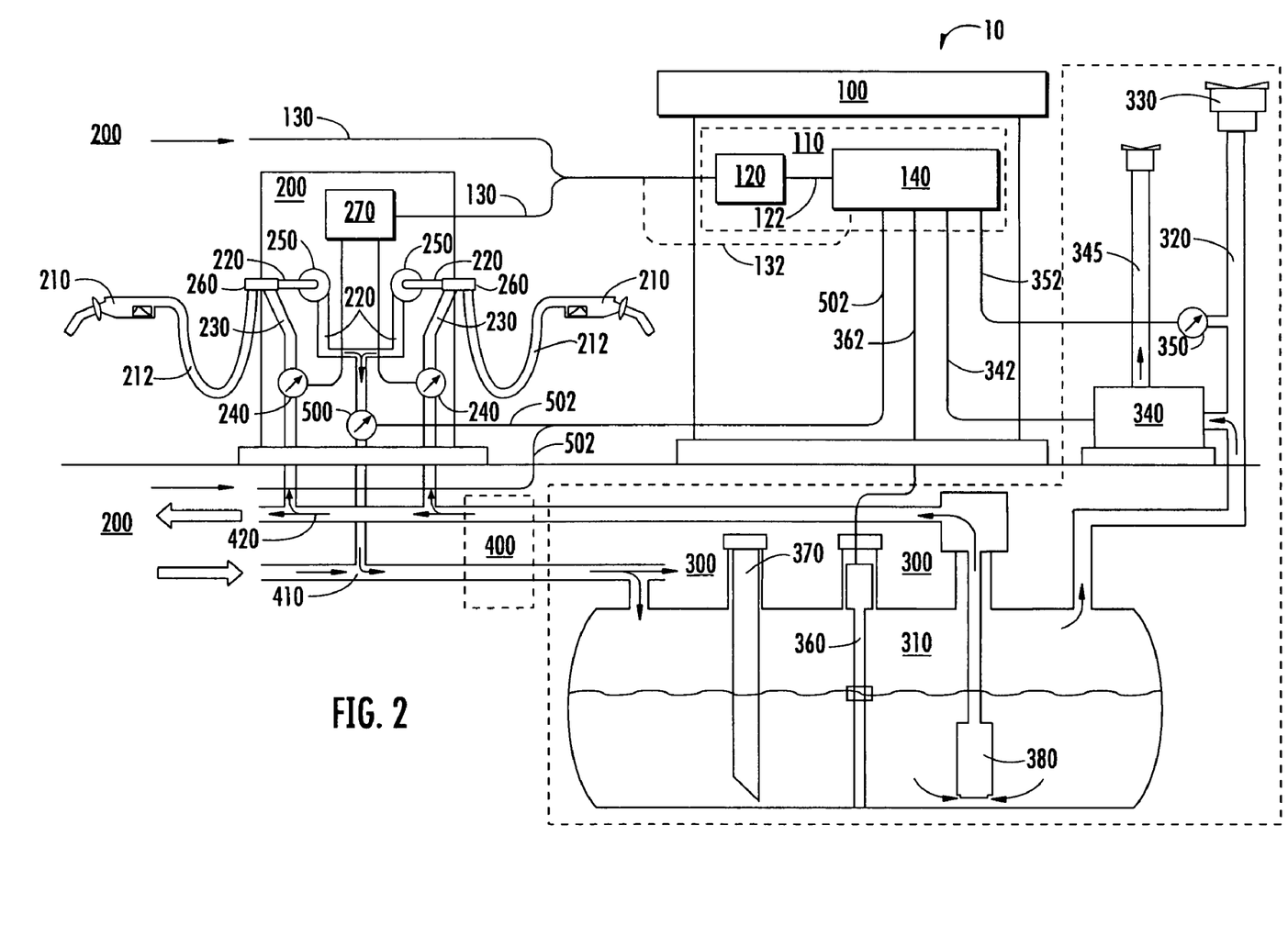
FIG. 2 is a schematic view of a fueling system vapor recovery performance monitor in accordance with another embodiment of the present invention.

With reference to a second embodiment of the invention shown in FIG. 2, it is appreciated that multiple AFS's 500 could be deployed to measure various groupings of dispensing point 210 vapor flows, down to a minimum of only two dispensing point vapor flows. The latter example may be realized by installing one AFS 500 in each dispenser housing 200, which typically contains two dispensing point's 210 (one dispensing point per dispenser side) or up to 6 dispensing points (hoses) in MultiProduct Dispensers (MPD's) (3 per side). The vapor flows piped through the vapor return passage 220 may be tied together to feed the single AFS 500 in the dispenser housing.

As stated above, the monitor 140 may connect to the dispenser controller 120, directly to the current loop interface wiring 130 or directly to the liquid fuel dispensing meter 240 to access the liquid fuel flow volume readings. The monitor 140 may also be connected to each AFS 500 at the facility 10 so as to be supplied with vapor flow amount (i.e. vapor volume) information. The liquid fuel flow volume readings are individualized fuel volume amounts associated with each dispensing point 210. The vapor flow volume readings are aggregate amounts resulting from various groupings of dispensing point 210 vapor flows, which therefore require mathematical analysis to separate or identify the amounts attributable to the individual dispensing points 210. This analysis may be accomplished by the monitor 140 which may include processing means. Once the vapor flow information is determined for each dispensing point 210, the A/L ratios for each dispensing point may be determined and a pass/fail determination may be made for each dispensing point based on the magnitude of the ratio. It is known that the ratio may vary from 0 (bad) to around 1 (good), to a little greater than 1 (which, depending upon the facility 10 design, can be either good or bad), to much greater than 1 (typically bad). This ratio information may be provided to the facility operator via an audio signal and/or a visual signal through the monitor 140. The ratio information may also result in the automatic shut down of a dispensing point 210, or a recommendation for dispensing point shut down.

The embodiments of the invention shown in FIGS. 1 and 2 may provide a significant improvement over known systems due to the replacement of the multiple AFS's 500 (one per dispensing point, typically anywhere from 10 or 12 up to 30 or more per site) and their associated wiring with a single, or fewer AFS's 500 (about ½ as many or less, depending upon dispensing point groupings).

With reference to the embodiments of the invention shown in both FIGS. 1 and 2, the mathematical analysis performed in the monitor 140 is designed to find correlations between aggregate vapor volume measured during AFS 500 'busy periods' and individual dispensing point 210 dispensed liquid fuel volume readings. The analysis is done separately for each AFS 500 and it's associated dispensing point group (two or more dispensing point's). The end result is a set of estimated dispensing point A/L ratios, one ratio per dispensing point. After a group of AFS 500 busy period data records are accumulated, a series of mathematical steps accomplish this beginning with a simple, 1-variable function solution and ending with more complex function solutions until all ratios are determined. If a ratio can be determined in an earlier step, it is not necessary to estimate it in a subsequent step (it can be set as a constant in later steps to simplify computation of any remaining unknown ratios). The sequence of solvable function types are:

Type 1: A single linear function with one unknown for any AFS busy records with only 1 active dispensing point.

Type 2: Two linear functions with two unknowns for any pair of similar AFS busy records with 2 (identical) active dispensing point's (two simultaneous equations with two unknowns).

Type 3: Three or more linear functions each with two or more unknowns for any remaining (unsolved) set of AFS busy records (at least as many functions as unknowns).

Each AFS 500 busy period data record is formed after the AFS becomes idle by recording the aggregate vapor volume, A, and the individual metered liquid volumes, $L_m$, where the subscript, m, denotes the dispensing point or meter number. This number ranges from 1 to M total meters. Idle detection can be done by various means, including:

1) the monitor 140 can track reported dispenser meter 240 start/stop events from the dispenser controller 120, the dispenser current loop wiring 130, or directly from the liquid fuel dispensing meter 240; or 2) the Automatic Tank Gauging System 360 can provide main fuel storage tank 310 liquid fuel levels to the monitor 140 for detection of static level conditions (no ongoing dispensing) in all the storage tanks 310.

The latter method (No. 2) can be used if it is desired that all AFS's 500 be idle prior to forming AFS busy data records. In the case of a single AFS 500 per facility 10 (shown in FIG. 1), this method can always be used.

The simple form of the relationship between A, L, and the A/L ratio, R, for an AFS busy record with one (1) active dispensing point is:

$$A = L_m R_m$$

so the simple solution for function type 1 is:

$$R_m = A/L_m$$

where $R_m$ is the estimated A/L ratio for active dispensing point (meter), m.

In the more general case, each AFS busy period data record, n, has a measured aggregate vapor volume, $A_n$, and the individual metered liquid fuel volumes, $L_{nm}$, where the first subscript, n, denotes the data record number and the second subscript, m, denotes the dispensing point or meter number as before. The record number, n, ranges from 1 to N total records.

The generalized form of the relationship between $A_n$, $L_{nm}$, and $R_m$ for multiple-dispensing point records is:

$$A_n = L_{n1}R_1 + L_{n2}R_2 + L_{n3}R_3 + \ldots L_{nm}R_m$$

In the case of a pair of similar busy records with 2 active dispensing point's (same 2 dispensing point's in both records) the relationships are:

$$A_1 = L_{11}R_1 + L_{12}R_2$$

$$A_2 = L_{21}R_1 + L_{22}R_2$$

so the solutions for functions of type 2 are:

$$R_1 = (A_1 L_{22} - A_2 L_{12})/(L_{11}L_{22} - L_{12}L_{21})$$

$$R_2 = (A_2 L_{11} - A_1 L_{21})/(L_{11}L_{22} - L_{12}L_{21})$$

Functions of type 3 can be solved as a least squares problem using standard matrix arithmetic.

Example record data set with subscript notation:

| n | $A_n$ | $L_{n1}$ | $L_{n2}$ | $L_{n3}$ | etc... | $L_{nM}$ |
|---|-------|----------|----------|----------|--------|----------|
| 1 | 18    | 0        | 12       | 6        | etc... | 0        |
| 2 | 33    | 10       | 15       | 0        | etc... | 8        |
| 3 | 21    | 7        | 0        | 0        | etc... | 14       |
|   |       |          | etc...   |          |        |          |
| N | 18    | 0        | 0        | 18       | etc... | 0        |

For the entire data set, the matrix relationship is:

$$\begin{bmatrix} A_1 \\ A_2 \\ A_3 \\ \vdots \\ A_n \end{bmatrix} = \begin{bmatrix} L_{11} & L_{12} & \cdots & L_{1m} \\ L_{21} & L_{22} & \cdots & L_{2m} \\ L_{31} & L_{32} & \cdots & L_{3m} \\ \vdots & \vdots & & \vdots \\ L_{n1} & L_{n2} & \cdots & L_{nm} \end{bmatrix} \begin{bmatrix} R_1 \\ R_2 \\ \vdots \\ R_m \end{bmatrix}$$

or $$A = LR$$

The solution for the ratio vector, R, is:

$$R = (L^T L)^{-1} L^T A$$

where the first term is the inverse of the transposed n×m matrix, L, times itself which results in an m×m matrix, the middle term is the transposed matrix, L, which is an m×n matrix, and the last term is the vector A of length n, all of which results in the vector R, of length m (one A/L ratio per meter).

This approach can provide good estimates of the true A/L ratios, even with excessive variability (noise) in the sensor readings. More records result in better estimates for a given level of variability but there must be at least as many records as unknowns for minimal performance.

Dispensing point ratio solutions are based on the simplest function type possible. As a data set is processed and ratio solutions are determined, they are in turn used to simplify solutions for remaining records in any record set. As an example, if two records exist in a set, one of type 1 (a single active dispensing point busy period), and a second with two active dispensing points, one of which is the same dispensing point as in the first record, the first record is solved directly as a type 1 function and it's ratio result is used to simplify the function for the second record. This produces a second type 1 function.

Example records (2):

| n | $A_n$ | $L_{n1}$ | $L_{n2}$ |
|---|-------|----------|----------|
| 1 | 5     | —        | 10       |
| 2 | 19.5  | 12       | 15       |

Initial functions:

$$A_1 = L_{12}R_2 \Rightarrow 5 = 10R_2$$

$$A_2 = L_{21}R_1 + L_{22}R_2 \Rightarrow 19.5 = 12R_1 + 15R_2$$

Solve first, substitute solution in second to simplify:

$5=10R_2 \Rightarrow R_2=5/10=0.5$ $19.5=12R_1+15R_2 \Rightarrow 19.5+12R_1+15*0.5=12R_1+7.5$ Solve second as a type 1 function:

$19.5=12R_1+7.5 \Rightarrow 12=12R_1 \Rightarrow R_1=12/12=1.0$

This simplification method is used at each step of the data set solution process:

Step 1: Form simple (1-dispensing point) or generalized function forms for each record.
Step 2: Solve all Type 1 functions.
Step 3: Substitute solutions from prior step into remaining set of functions.
Step 4: Reduce all functions to simpler forms and repeat from step 2.
Step 5: Find and solve any Type 2 function pairs.
Step 6: Substitute solutions from prior step into remaining set of functions.
Step 7: Reduce all functions to simpler forms and repeat from step 2.
Step 8: If possible, solve remaining functions as a Type 3 least squares problem.
Step 9: If step 8 is not possible, wait for more data records to solve the remaining functions.

Alternatively, replace the 9-step sequence with steps 8 and 9 alone. This approach has the benefit of always averaging or reducing the effects of variability in the sensor readings.

The various embodiments of the invention discussed herein may also be used to detect vapor recovery equipment failures. Stage-II vapor recovery equipment failures can have two distinct effects on patterns of A/L ratios. The failures are determined by identifying these patterns in the solved ratio set. The first type of failure involves a dispensing point nozzle 210, a hose 212, or vapor return passage 220 path restriction, or a vacuum assist pump failure which blocks or reduces air-vapor flow. The above solution methods may be used to identify this type of failure by identification of one dispensing point with a consistently lowered ratio.

The second type of failure that can occur involves a dispensing point 210 with a defective air valve which does not close properly to block reverse vapor flow (i.e. out of the nozzle) when the dispensing point is idle. In such a case the ratio for the defective dispensing point will not be affected because when the dispensing point is active, the vapor flow is normal. However, when idle, vapors from other active dispensing points can be pushed past the defective air valve, out of the leaky dispensing point nozzle, and into the atmosphere. The active dispensing point(s) AFS 500 may or may not register the amount of lost vapor, depending upon whether the leaking dispensing point is part of the AFS group (won't register) or not (will register). If not, the idle AFS 500 will register reverse vapor flow. In that case, the leaking dispensing point can be detected by the reverse flow signal when it should be idle.

Using the above solution methods described in connection with the first and second embodiments of the invention, when the leaking dispensing point is a member of the active AFS 500 group it results in lowered ratios for all dispensing points in the group except for the leaking dispensing point. Also, the lowered ratios vary depending upon the number of active dispensing point's during each busy period. When more (good) dispensing point's are active in an AFS 500 group, the lost vapor effect is shared in the solution, resulting in less depression of the individual ratios. Furthermore, if only part of the vapors escape to the atmosphere, the effect is reduced, resulting in less depression of the individual ratios. Accordingly, a post-solution analysis may be conducted on the ratio patterns to determine the likely failure type, active dispensing point restriction or idle dispensing point leak.

A third embodiment of the invention concerns the use of a single vapor pressure sensor 350 (same as CARB requirement) to actively determine the tightness of the overall vapor containing elements of the facility including the fuel storage system 300, (which includes the vent pipe 320, pressure relief valve 330, etc.), the vapor return pipelines 410, the vapor/liquid splitter 260, the vapor return passages 220, the dispenser hose 212, the nozzle 210, etc. The vapor pressure sensor 350 may be connected anywhere in the fuel storage system 300 or the pipeline system 400, which includes but is not limited to the storage tank 310 vapor-space, the common vapor return pipeline 410, or the storage tank vent pipe 320. The vapor pressure sensor 350 may be used periodically to actively measure the leakage of vapors from the overall system instead of constantly measuring for leakage amount.

The method in accordance with the third embodiment of the invention may be carried out as follows. The monitor 140 may be connected to and access pressure readings from the vapor pressure sensor 350. The monitor 140 controls the active test which is initiated by determining an idle period during which none of the dispensing units 200 are in operation (similar to the A/L detection method using either dispensing meter events or ATGS tank levels). The idle condition may be continuously monitored and the test aborted if any dispensing units go into operation during the test. During the idle period the vapor pressure sensor 350 is used to determine the pressure in the system (i.e. the pressure in the storage tank 310). If the pressure is not adequately negative (vacuum) for the test, the vapor processor 340 may be turned on to draw a negative pressure in the storage tank 310 as it processes vapors. If the vapor processor 340 is used, the monitor 140 may be used to monitor the vapor pressure readings until they become adequately negative, typically −2 or −3 inches w.c. Once the vapor pressure is adequately negative, the vapor processor 340 may be turned off. Thereafter the vapor pressure sensor 350 readings may be monitored during the remaining idle time. If the system is adequately tight, the negative pressure readings should hold or degrade only slowly. If the negative pressure degrades too rapidly toward zero, the monitor 140 may indicate that the system has failed the leakage test. A pass/fail threshold is used to make this determination. It can be set as a percentage of the initial negative pressure amount based on the desired detection sensitivity and should be related to the amount of air inflow detected relative to total storage tank 310 vapor space (ullage volume).

In an alternative of the third embodiment of the invention, a single or multiple AFS's 500 located in the common or multiple vapor return pipeline(s) (same as A/L detection equipment) may be included to conduct an improved active test for system tightness. While a pressure sensor 350 alone suffices for conducting a tightness test, AFS 500 readings can add to the amount of information available to augment test sensitivity and confirm the tightness condition or help locate the source of a leak. Any air inflow from a leak point will register as flow on the AFS(s) 500. Flow and flow direction are a general indicator of the location of the source of incoming air (which dispensers and/or tanks/vents). Note that the AFS 500 readings are generally the more sensitive indicator of vapor recovery system tightness failure since negative pressure degradation is small due to the small amount of air inflow over seconds or minutes of time relative to the generally large storage tank vapor-space volumes. For significant negative pressure degradation, the amount of air inflow needs to be a significant portion of the storage tank vapor-space volume which can be in the thousands or tens of thousands of gallons.

The optional AFS(s) 500, and dispenser controller 120, dispenser current loop 130, or optional ATGS 360 are connected to the monitor 140 which acquires and processes the data from the devices to conduct the tightness test and also controls (on/off) the vapor processor 340. Note that only one vapor pressure sensor 350 is needed for multiple storage tanks 310 as long as they share a common vapor recovery system so that their vapor spaces are connected (piped) together.

In another alternative embodiment of the invention, the ATGS 360 may not be required to conduct an active test for system tightness. In this case, the idle state of the vapor recovery system during which the tightness test is conducted must be determined by (lack of) fueling meter 240 activity and a precise estimation of leak rate is not possible since tank 310 vapor ullage space volume is not known. Instead, a general pass/fail indication can be provided when the pressure decays at a preset rate during a test period.

In yet another embodiment of the present invention, the systems shown in FIGS. 1 and 2 may be used to conduct an improved passive vapor containment test. This test uses pressure in the vapor containing elements of the facility, barometric pressure, and ullage space measurements to calculate the change in pressure over time for the vapor containing elements of the facility. This calculation, which is not usually based on data collected when the facility is operating at −2 to −3 inches w.c., may then be normalized to indicate leakage rates for a facility held at −2 to −3 inches w.c.

This passive method may be initiated by monitoring the pressure of the main fuel storage system 300 or any vapor containing element of the facility 10 between fuel dispensing periods with the pressure sensor 350. Pressure data derived from sequential groupings of monitored pressures and ullage determinations derived from the ATGS 360 readings are recorded at periodic intervals by monitor 140. The derived recorded data permits the determination of rate of change of pressure, $p_{rate}$, versus time, t, obtained from a linear regression model:

$$p = p_{rate} * t$$

within each interval, the main storage system 300 total ullage volume, $V_{ullage}$ represented by the sum of the individual storage tank 310 ullage volumes, $V_{ullage}$:

$$V_{ullage} = v_{ullage1} + v_{ullage2} + \ldots + v_{ullageN} \text{ for tanks 1 to } N$$

where $v_{ullage}$ = (tank capacity) − (volume of fuel in tank) obtained from the ATGS 360, and the average pressure, $p_{avg}$ over each interval:

$$p_{avg} = (p_1 + p_2 + \ldots + p_N)/N \text{ for pressure samples 1 to } N \text{ in the interval}$$

are recorded if the correlation to the linear model is acceptable, generally based on high correlation between pressure with respect to time and the model.

Figure 3:
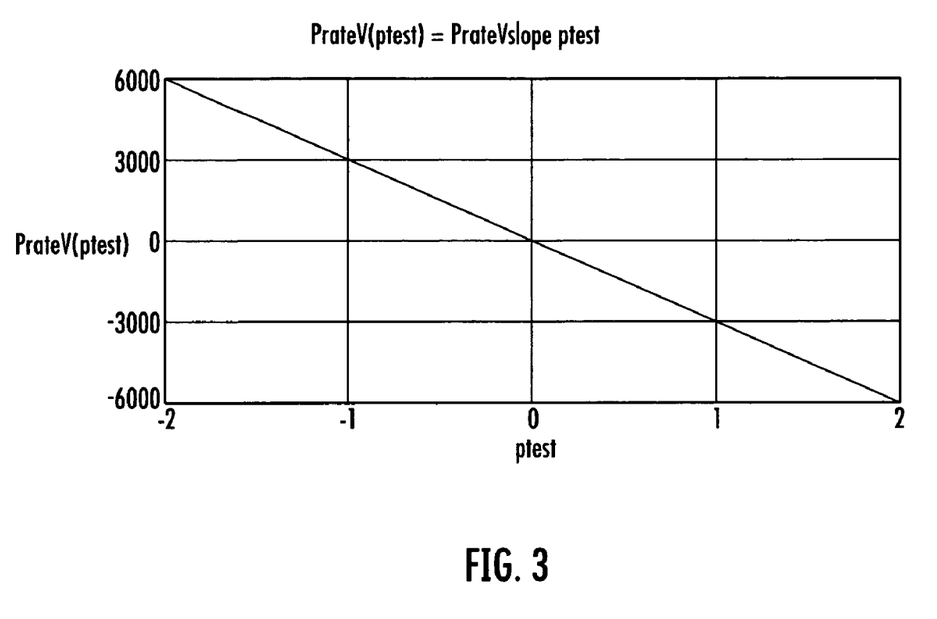
FIG. 3 is a graph used to convert vapor leakage rates based on ullage pressures.

Upon collection of a daily sample of such records, the product of pressure rate and the total ullage volume, $p_{rate} \cdot V_{ullage}$, is sorted by the associated average pressure, $p_{avg}$, and grouped into equally spaced average pressure ranges. A collection of averages of the products, $(p_{rate} V_{ullage})_{avg}$, within each group:

$$(p_{rate} V_{ullage})_{avg} = ((p_{rate} \cdot V_{ullage})_1 + (p_{rate} \cdot V_{ullage})_2 + \ldots + (p_{rate} \cdot V_{ullage})_N)/N$$

for products 1 to N in each group. The midpoints of the average pressure ranges, $p_{mid}$, within each group are used with a linear regression model to estimate the rate of change of pressure times ullage volume, $P_{rate}V$ at a selected test pressure, $p_{test}$, of, say, 2 inches of water column, if the correlation to the linear model:

$$P_{rate}V = (P_{rate}V)_{slope} \cdot p_{test}$$

is acceptable generally based on high correlation between the average products, $(p_{rate}V_{ullage})_{avg}$, with respect to midpoint pressures, $p_{mid}$, and the model. A typical graph of this model for a tank system is shown in FIG. 3. It is noted that the curve must cross the origin which indicates no rate of change of pressure, thus no leakage, when there is zero pressure drop across any leakage path, since for leakage to occur a pressure driving force is needed regardless of ullage volume.

The regression yields the slope coefficient, $(P_{rate}V)_{slope}$, which is used to calculate the estimated pressure times ullage volume, $P_{rate}V$ at a selected test pressure, $p_{test}$, of, say, 2 inches of water column at which a leakage test failure rate can be defined, similar to the standard CARB TP-201.3 test procedure. In other words, if there is a leakage path and if the pressure in the ullage space of the tank system is set to 2" wcg (water column gauge) (above ambient pressure), the tank will leak at the estimated rate, $v_{rate}$, of:

$$v_{rate} = P_{rate}V(p_{test})/p$$

where p is the absolute pressure in the tank ullage space, typically 410" wca (water column absolute) (assuming ambient is 408" wca). This can be interpreted to mean that the rate of volume vapor loss from a leaking tank is equal to the proportional rate of change of absolute pressure times the total ullage volume. Note that $p_{test}$ is a gauge pressure (referenced to ambient) and p is an absolute pressure (referenced to a vacuum). This relationship is derived from the ideal gas law, which governs the relationship between pressure, p, and volume, v, in an enclosed space at low pressures and temperatures:

$$p \cdot v = n \cdot R \cdot T$$

where n is moles of gas, R is the universal gas constant, and T is absolute temperature. Replacing n with mass per molecular weight (MW):

$$p \cdot v = m \cdot R \cdot T / MW$$

Rearranging terms and replacing constant terms with k:

$$m = k \cdot p \text{ where } k = v \cdot MW/(R \cdot T)$$

Rate of mass loss due to a leak from an enclosed space is found by forming the relationship of the difference between the ending and starting mass divided by starting mass and the time period of the loss:

$$(m2 - m1)/m1 \cdot t = (k \cdot p2 - k \cdot p1)/k \cdot p1 \cdot t$$

$$\Delta m/(m1 \cdot t) = (p2 - p1)/p1 \cdot t$$

$$\Delta m/(m1 \cdot t) = \Delta p/p1 \cdot t$$

$$\Delta m/t = \Delta p \cdot m1/p1 \cdot t$$

The last form describes the rate of mass loss as a function of starting mass times proportional pressure change rate over the test period. To find volume loss rate, relate mass and volume by mass density, p:

$$p = m/v \text{ or } m = p \cdot v \text{ so } m1 = p1 \cdot v \text{ and mass loss: } \Delta m = p \cdot \Delta v$$

Substituting in above equation:

$$p \cdot \Delta v/t = \Delta p \cdot p1 \cdot v/p1 \cdot t$$

Assuming mass density does not change appreciably:

$$\Delta v/t = \Delta p \cdot v/p1 \cdot t \text{ where } p1 \approx p$$

Dropping the subscript and using notation for volume loss rate, $v_{rate}$:

$$v_{rate} = \Delta p \cdot V/p \cdot t$$

which can be interpreted to mean that the volume loss rate is the proportional change of pressure times volume per unit time. But part of this expression is the calculated value derived from measurements in the above section:

$$v_{rate} = P_{rate} V/p \text{ where } v_{rate} = \Delta p \cdot v/t \text{ at the selected test pressure, 2" wcg}$$

Using the above example, the volume leak rate, $v_{rate}$, is:

$$v_{rate} = P_{rate} V/p = 6000/410 = 14.6 \text{ CFH or cubic feet per hour at 2" wcg}$$

As described above, in yet another embodiment of the invention, the system may also perform a method of distinguishing between true vapor recovery failure events and ORVR equipped vehicle refueling events. Identifying a false vapor recovery system failure due to refueling an ORVR-equipped vehicle may be accomplished by applying standard statistical concepts to a group of dispensing or refueling events from all the dispensing points 210 at a dispensing facility 10 to identify true failed vapor collection dispensing points as opposed to failed tests due to ORVR vapor-blocking activity.

There are two assumptions that may be made as a predicate to determining true failed vapor collection: (1) that ORVR and non-ORVR activity occurs somewhat randomly amongst all the dispensing points; and (2) that average ORVR activity does not reach 100% of all refueling events (a maximum of 80% can be assumed). Given these assumptions, a group of vapor collection event A/L measurements taken from all the dispensing points 210 at a dispensing facility 10 may be used to make the following determinations:

1) Determine if the proportions of failed (close to zero A/L) and non-failed events are statistically different at individual dispensing points relative to their expected proportions, due to the activity of ORVR vehicles, derived from all the dispensing points; and 2) Determine if the proportion of the failed (close to zero) events at each dispensing point are statistically different from the proportion of the failed events derived from all the dispensing points, which are largely due to the effect of ORVR vehicles.

As a result of these determinations, the A/L ratio measurements may be used to test for blockage or leakage caused vapor recovery failure, with a mix of ORVR and non-ORVR vehicle activity.

On a regular (e.g. daily) basis, each dispensing point 210 may have a number of A/L determinations associated with it. It is presumed that there are k dispensing points 210 and the $i^{th}$ dispensing point has $n_i$ A/L ratio determinations. Let $X_i$ be the number of A/L determinations for dispensing point I that indicate a "zero" or "blocked" A/L ratio. The assumption is that fueling an ORVR vehicle will result in a zero or blocked A/L ratio. The total number of A/L determinations for the site is:

$$n = \Sigma n_i$$

and the total number of zero A/L ratios is:

$$X = \Sigma X_i$$

An overall test can be conducted to determine whether there are any significant differences in the proportion of A/L ratios indicating blocked vapor flow among the dispensing points 210. This can be accomplished using a chi-squared test on the table of data from the k dispensers:

|  | Dispenser 1 | Dispenser 2 |  | Dispenser k | Total |
|---|---|---|---|---|---|
| Number blocked | X1 | X2 | ... | Xk | X |
| Not blocked | n1 – X1 | n2 – X2 | ... | nk – Xk | N – X |
| Number | n1 | n2 | ... | nk | N |

The chi-squared statistic is given by: $X^2 = \Sigma (O_i - E_i)^2 / E_i$ where $O_i$ is the number observed in each cell of the table and $E_i$ is the expected number in that cell. The data in the cells indicate the number of A/L ratios that indicate a "blocked" condition for each dispensing point and the number of A/L ratios indicating a "not blocked" condition for that dispenser. The expected number "blocked" ratios for dispenser I is:

$$E_{i1} = n_i (X/N)$$

and the expected number of "not blocked" ratios for dispenser I is:

$$n_i - E_i$$

The summation is carried out over 2 k cells. This statistic is compared to the critical value from a chi-squared table with k–1 degrees of freedom. If it is significant, there is evidence that the dispensers have different proportions of blocked A/L ratios, so that one or more would appear to be blocked on at least an intermittent basis.

In turn, an individual test can be performed for each dispenser. This tests whether each dispenser has a proportion of zero A/L ratios that exceeds the overall proportion for the station. The following equation may be used to compute the overall proportion of zero A/L ratios for the period:

$$P = X/N$$

The following equation may be used to compute the proportion of zero A/L ratios for each dispenser:

$$p_i = x_i / n_i$$

From the foregoing calculations, it may be concluded that there is evidence that dispenser I is blocked if:

$$p_i > P + z_\alpha (0.16/n_i)^{1/2}$$

where $z_\alpha$ is the upper a percentage point from a standard normal distribution. If a 1% significance level is desired, $z_\alpha$ is 2.326, for example, (or 1.645 for a 5% significance level). The number 0.16 in the formula results from assumption of the most conservative case; that 80% of the vehicles are ORVR vehicles. Once a truly blocked dispensing point is detected, an audio or visual signal may be provided by the monitor 140 to indicate this condition. Truly blocked dispensing points may also be automatically shut down as a result of such detection.

It will be apparent to those skilled in the art that various modifications and variations may be made in the preparation and configuration of the present invention without departing from the scope and spirit of the present invention. For example, various combinations of the methods described above may be implemented without implementing the full system shown FIGS. 1 and/or 2. Thus, it is intended that the present invention cover the modifications and variations of the invention.

I claim:

1. A method of monitoring a vapor recovery system that recovers vapors expelled from vehicles during refueling at a plurality of fuel dispensing points and returns the vapors to an underground storage tank in a service station environment, comprising:

measuring amounts of fuel flow delivered to the vehicles at respective said fuel dispensing points;

measuring amounts of vapor flow recovered at the respective fuel dispensing points to be returned through a vapor flow path to the underground storage tank from the respective fuel dispensing points using at least one vapor flow sensor disposed in the vapor flow path, wherein the number of the at least one vapor flow sensors is less than the number of the respective fuel dispensing points that can be active at any one time; and determining an amount of vapor flow recovered by each of the respective fuel dispensing points using a said amount of vapor flow recovered at the respective fuel dispensing point.

2. The method of claim 1, wherein the step of measuring the amounts of vapor flow is performed in the vapor flow path that is common to all of the plurality of fuel dispensing points.

3. The method of claim 1, further comprising determining a ratio of vapor flow to fuel flow for each of the respective fuel dispensing points by dividing an amount of vapor flow recovered at the respective fuel dispensing point by an amount of fuel flow delivered at the respective fuel dispensing point.

4. The method of claim 1, wherein the number of the at least one vapor flow sensors is greater than one, and wherein each said vapor flow sensor is disposed in the vapor flow path between a respective sub-plurality of fuel dispensing points of the plurality of fuel dispensing points and the underground storage tank.

5. The method of claim 4, wherein, for each said vapor flow sensor, the step of measuring the amounts of vapor flow comprises, for each said respective fuel dispensing point, measuring first amounts of vapor flow recovered when only the respective fuel dispensing point is active.

6. A method of monitoring a vapor recovery system that recovers vapors expelled from vehicles during refueling at a plurality of fuel dispensing points and returns the vapors to an underground storage tank in a service station environment, comprising:

measuring amounts of fuel flow delivered to the vehicles at respective said fuel dispensing points of a fuel dispensing unit, the fuel dispensing unit including a plurality of fuel dispensing points for respective vehicles;

measuring amounts of vapor flow recovered at the respective dispensing points to be returned through a vapor flow path to the underground storage tank from the respective fuel dispensing points using a single vapor flow sensor disposed in the vapor flow path, wherein the vapor flow path is common to the plurality of fuel dispensing points and multiple fuel dispensing points can be active at any one time; and determining a ratio of vapor flow to fuel flow for each of the respective fuel dispensing points by dividing an amount of vapor flow recovered at the respective fuel dispensing point by an amount of fuel flow delivered at the respective fuel dispensing point.

7. The method of claim 6, wherein, for each respective fuel dispensing point, the step of measuring the amounts of vapor flow recovered at the respective fuel dispensing points occurs when only said fuel dispensing point is active.

8. The method of claim 6 further comprising determining an amount of vapor flow recovered by each of the respective fuel dispensing points by estimating an amount of vapor flow recovered by each of the respective fuel dispensing points by using multiple measurements of the amounts of vapor flow recovered.

9. A method of monitoring a vapor recovery system that recovers vapors expelled from vehicles during refueling at a plurality of fuel dispensing points and returns the vapors to an underground storage tank in a service station environment, comprising:

(a) measuring amounts of fuel flow delivered to the vehicles at respective said fuel dispensing points;

(b) measuring amounts of vapor flow recovered at the respective fuel dispensing points to be returned back through a vapor flow path back to the underground storage tank from the respective fuel dispensing points using a single vapor flow sensor disposed in the vapor flow path, wherein multiple of the respective fuel dispensing points can be active at any one time;

(c) determining an amount of vapor flow recovered by each of the respective fuel dispensing points using a said amount of vapor flow recovered at each first said respective fuel dispensing point and returned back to the underground storage tank through the vapor flow path when the first fuel dispensing point is the only active fuel dispensing point that provides vapor flow to the vapor flow path; and (d) determining a ratio of vapor flow to fuel flow for each of the first fuel dispensing points by dividing the amount of vapor flow recovered at the first fuel dispensing point at step (c) by the amount of fuel flow delivered at the first fuel dispensing point at step (a).

10. The method of claim 9, wherein the step of determining an amount of vapor flow recovered by each of the respective fuel dispensing points further comprises estimating the amount of vapor flow recovered by each of the respective fuel dispensing points by using multiple measurements of the amounts of vapor flow recovered at the respective fuel dispensing points.

11. A method of monitoring a vapor recovery system that recovers vapors expelled from vehicles during refueling at a plurality of fuel dispensing points and returns the vapors to an underground storage tank in a service station environment, comprising:

measuring amounts of fuel flow delivered to the vehicles at respective said fuel dispensing points;

measuring amounts of vapor flow recovered at the respective fuel dispensing points to be returned through a vapor flow path to the underground storage tank from the respective fuel dispensing points using at least one vapor flow sensor disposed in the vapor flow path, wherein the number of the at least one vapor flow sensors is less than the number of the respective fuel dispensing points that can be active at any one time; and determining an amount of vapor flow recovered by each of the respective dispensing points using a said amount of vapor flow recovered at the respective fuel dispensing point at a time when only said respective fuel dispensing point is active.

12. The method of claim 11, further comprising the step of determining a ratio of vapor flow to fuel flow for each of the respective fuel dispensing points.

13. The method of claim 11, further comprising the step of determining a ratio of vapor flow to fuel flow for each of the respective fuel dispensing points, wherein the step of determining a ratio comprises (a) identifying a said amount of vapor flow recovered at the respective fuel dispensing point at the time, (b) identifying a said amount of fuel flow delivered to a vehicle at the respective fuel dispensing point at the time, and (c) dividing the amount of vapor flow identified at step (a) by the amount of fuel flow identified at step (b).

14. A vapor recovery system that recovers vapors during fueling operations and returns the vapors to an underground storage tank, comprising:
- a plurality of fuel dispensing points that deliver fuel from the underground storage tank when active, wherein multiple of the plurality of fuel dispensing points can be active at any one time;
- a vapor flow path that is in fluid communication with each of the plurality of fuel dispensing points and the underground storage tank;
- a vapor flow sensor that is operatively connected to the vapor flow path so that the vapor flow sensor detects an amount of vapor flow being returned to the underground storage tank through the vapor flow path; and
- a processor in communication with the vapor flow sensor that measures an amount of vapor flow being returned to the underground storage tank through the vapor return path when only one of the plurality of fuel dispensing points is active.

15. The vapor recovery system of claim 14, further comprising respective fuel flow paths between the underground storage tank and the plurality of fuel dispensing points and respective fuel flow sensors operatively connected to the respective fuel flow paths so that the respective fuel flow sensors detect amounts of fuel flowing to the fuel dispensing points, and wherein the processor is in communication with the fuel flow sensors so that the processor measures an amount of fuel flow delivered at the only one fuel dispensing point.

16. The vapor recovery system of claim 15, wherein the processor determines a ratio of an amount of vapor flow being returned to the underground storage tank to an amount of fuel flow delivered by the only one fuel dispensing point.

17. A vapor recovery system that recovers vapors during fueling operations and returns the vapors to an underground storage tank, comprising:
- a plurality of fuel dispensing points that deliver fuel from the underground storage tank when active;
- a vapor flow path that is in fluid communication with each of the plurality of fuel dispensing points and the underground storage tank;
- a vapor flow sensor that is operatively connected to the vapor flow path so that the vapor flow sensor detects an amount of vapor flow being returned to the underground storage tank through the vapor flow path, wherein the number of said vapor flow sensors operatively connected to the vapor flow path is less than the number of fuel dispensing points of the plurality of fuel dispensing points; and
- a processor in communication with the vapor flow sensor that measures an amount of vapor flow being returned to the underground storage tank through the vapor return path.

* * * * *